US008264929B2

(12) United States Patent
Erickson et al.

(10) Patent No.: US 8,264,929 B2
(45) Date of Patent: Sep. 11, 2012

(54) OPTICAL MEDIUM RECOGNITION SYSTEM AND METHOD WITH AN OPTICAL DRIVE HAVING PLURAL LASERS

(75) Inventors: Dirk Erickson, Austin, TX (US); Ed Beeman, Fort Collins, CO (US); Thomas L. Pratt, Austin, TX (US); Christiaan Steenbergen, Austin, TX (US); Charles Robert Weirauch, Loveland, CO (US)

(73) Assignee: Dell Products L.P., Round Rock, TX (US)

( * ) Notice: Subject to any disclaimer, the term of this patent is extended or adjusted under 35 U.S.C. 154(b) by 2458 days.

(21) Appl. No.: 10/722,712

(22) Filed: Nov. 25, 2003

(65) Prior Publication Data

US 2005/0111327 A1 May 26, 2005

(51) Int. Cl.
*G11B 7/00* (2006.01)
*G11B 7/24* (2006.01)

(52) U.S. Cl. ............... 369/53.22; 369/53.2; 369/47.22; 369/275.3

(58) Field of Classification Search ............... 369/53.2, 369/53.22
See application file for complete search history.

(56) References Cited

U.S. PATENT DOCUMENTS

| | | | |
|---|---|---|---|
| 5,757,742 A * | 5/1998 | Akiba et al. ............... | 369/44.23 |
| 5,949,955 A | 9/1999 | Nakai ............................ | 386/106 |
| 6,445,523 B2 | 9/2002 | Thomas, III et al. ........... | 360/48 |
| 6,449,095 B1 | 9/2002 | Ohtaki et al. ................. | 359/566 |
| 6,452,880 B1 * | 9/2002 | Kawamura et al. ......... | 369/44.37 |
| 6,584,278 B2 | 6/2003 | Ando et al. ..................... | 386/98 |
| 6,630,995 B1 | 10/2003 | Hunter ........................ | 356/237.5 |
| 6,999,387 B2 * | 2/2006 | Kuwayama ................ | 369/44.23 |
| 7,079,474 B2 * | 7/2006 | Takahashi .................... | 369/120 |
| 2002/0080700 A1 | 6/2002 | Watanabe et al. .......... | 369/53.22 |
| 2003/0095486 A1 | 5/2003 | Furuichi et al. ............. | 369/53.22 |
| 2003/0095487 A1 * | 5/2003 | Nishizawa et al. ........ | 369/53.23 |

FOREIGN PATENT DOCUMENTS

| | | |
|---|---|---|
| EP | 0 899 723 A2 | 5/1998 |
| EP | 0 899 723 A3 | 5/1999 |
| EP | 1 130 593 A2 | 1/2001 |
| EP | 1 349 163 A2 | 3/2003 |
| WO | 2004/081923 A1 | 9/2004 |

* cited by examiner

*Primary Examiner* — Muhammad N Edun
(74) *Attorney, Agent, or Firm* — Hamilton & Terrile, LLP; Robert W. Holland

(57) ABSTRACT

An optical medium associated with a first type of optical drive laser, such as a blue laser, embeds identification information readable by a second type of optical drive laser, such as a red laser associated with DVD media or an IR laser associated with CD media, in order to reduce the time used by the optical drive to recognize media. An attempt to read the embedded identification information by the second laser that succeeds provides the optical drive with the information to proceed with use of the optical medium using the first laser. An attempt to read the embedded identification information that fails provides the optical drive with the opportunity to detect whether the optical medium is associated with the second laser so that a single spindle kick of the optical medium by the optical drive determines whether the optical medium is associated with either of two types of lasers.

20 Claims, 3 Drawing Sheets

OPTICAL MEDIUM RECOGNITION SYSTEM AND METHOD WITH AN OPTICAL DRIVE HAVING PLURAL LASERS

BACKGROUND OF THE INVENTION

1. Field of the Invention

The present invention relates to the field of storing information on optical media, and more particularly to a system and method for recognition of the type of optical media inserted into an optical drive.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have become more common and have improved in the speed at which they process information, increasing amounts of information have been generated for storage. Optical media provide a sensible and relatively inexpensive solution for storing large quantities of information on a portable material. Generally, an optical medium stores information by altering the reflective qualities of a data layer material with a focused laser and allows retrieval of information by reflection of the focused laser against the altered material to measure the reflected light characteristics. However, the precise characteristics of optical media vary widely to accommodate different storage speeds, densities and functions. Optical media materials have developed from supporting relatively simple CD-R discs that write data only once for each area to more complex materials that support rewritable CD-RW discs with repeated writing of data over the same areas of a medium. Storage densities have increased from less than a gigabyte with infrared laser CD formats to several gigabytes with red laser writable and re-writable DVD formats, and even greater densities with planned blue laser media. Optical drives typically manage writes to different types of optical media by reading and applying information embedded on an optical medium, such as information embedded according to PEP standard of ISO/ANSI. Embedded information is generally stored at the inner portion of an optical medium so that an optical disc drive pickup unit finds the embedded information from its "crash stop" position, which is generally the closest possible position of the pickup unit to the center spindle of the optical medium.

One difficulty with the management of different types of optical media is the time that it sometimes takes for an optical drive to identify the type of optical medium that is inserted so that a user can read or write information with the optical medium. Generally, an optical drive recognizes an inserted optical medium by performing a detection algorithm for each type of laser available to the optical medium. For instance, if the optical drive supports DVD and CD formats, the red laser is typically activated first to determine if the inserted optical medium is a DVD and then the infrared laser is typically activated to determine if the inserted optical medium is a CD. However, for each type of optical medium supported by a drive a separate spindle kick is generally needed to turn the medium at an appropriate speed for reading by the drive's pickup. In some instances, several spin speeds are used for each detection algorithm so that processing through each possible type of optical medium tends to be a time consuming process. The amount of time will increase further as optical drives evolve to support other types of media, such as blue laser media, and thus have to run through additional detection algorithms.

SUMMARY OF THE INVENTION

Therefore a need has arisen for a system and method which reduces optical drive recognition time for inserted optical media.

In accordance with the present invention, a method and system are provided which substantially reduce the disadvantages and problems associated with previous methods and systems for recognition of an optical medium by an optical drive. Identification information for recognition of a first type of optical media associated with a first type of laser is embedded in an optical medium of the first type to be readable by a laser associated with a second type of optical media so that the laser associated with the second type of optical media is used to recognize both the first and second types of optical media and thus reduce recognition time for the optical drive.

More specifically, embedded disc information (EDI) used to identify optical media associated with a blue laser is embedded in a blue laser medium to be readable by a red laser. Upon insertion of an optical medium into an optical drive, an identification module initiates a recognition process by using the red laser to attempt to read embedded identification information. If the red laser reads EDI information that indicates that the optical medium is a blue laser medium, the optical drive is initiated to use the optical medium according to the read EDI information and use proceeds with the blue laser. If the red laser fails to read EDI information, the optical medium is assumed not to be a blue laser optical medium and the identification module proceeds with a DVD detection algorithm to determine whether the inserted optical medium is a red laser medium. If the DVD detection algorithm detects a red laser optical medium, the red laser is used by the optical drive, and if the DVD algorithm fails to detect a red laser optical medium, the optical drive initiates detection algorithms for remaining lasers, such as infrared lasers associated with CD media.

The present invention provides a number of important technical advantages. One example of an important technical advantage is that optical medium recognition time for an optical drive is reduced by allowing a single laser to determine whether an inserted optical medium is one of plural types of media. Embedding of blue laser media identification information with a red laser readable format allows a red laser to read blue laser information if it is present on a medium and otherwise detect whether the medium is a red laser medium using a single spindle kick for detection of both types of media. The use of single spindle kick reduces optical disc drive recognition time by eliminating the need during the recognition process for illumination of the optical medium with both types of lasers.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Embedding blue laser identification information with a red or infrared laser readable format on blue laser media allows recognition of optical media in reduced time for improved information handling system performance by allowing a single laser to recognize both its own type of media and blue laser media. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
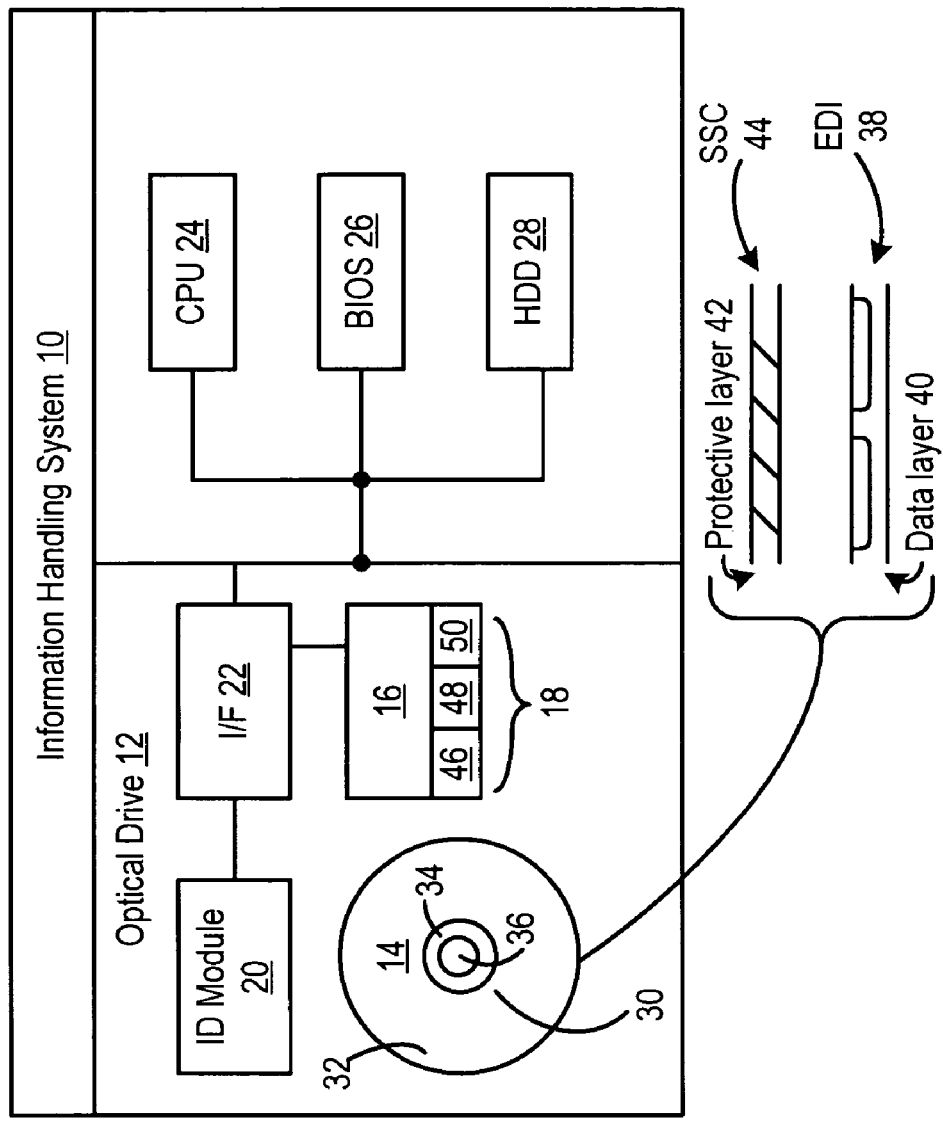
FIG. 1 depicts a block diagram of an information handling system having an optical drive configured to recognize plural types of media.

Referring now to FIG. 1, a block diagram depicts an information handling system 10 having an optical drive 12 that reads identification information from an optical medium 14 with a pick-up read head 16 and associated laser 18. Optical drive 12 applies identification information determined by an identification module 20 prior to reading or writing user data to determine a write strategy for writing information to optical medium 14 that is received through interface 22 from processing components of information handling system 10, such as CPU 24, BIOS 26 and hard disc drive 28. Optical medium 14 embeds a first set of information into the data layer of optical medium 14 and a separate and distinct aligned second set of information on the protective surface layer of optical medium 14 as disclosed in U.S. patent application Ser. No. 10/722,268, entitled "Optical Medium Aligned Information System and Method," incorporated herein by reference. The first set of embedded disc information (EDI) 38 is stored in the data layer 40 of optical medium 14 in eight repeated portions. The second set of serial surface code (SSC) information 44 may exist on the outside surface of protective layer 42 aligned with the first set of EDI information but disposed so that EDI information remains readable. In this manner, when optical medium 14 is first inserted into optical drive 12, pick-up read head 16 proceeds to a predetermined location and reads both the EDI and, if present, the SSC sets of information.

Optical drive 12 includes three types of lasers 18 for writing or reading information to or from optical media associated with each type of laser. A blue laser 46, having a frequency of approximately 405 nm, communicates information with optical media adapted for high density storage by blue laser light. A red laser 48 having a frequency of approximately 650 nm, communicates information with optical media adapted for DVD formatted storage. A infrared (IR) laser 50 communicates with optical media adapted for CD formatted storage. When an optical medium 14 is first inserted into optical drive 12, identification module 20 commands pick-up read head 16 to a predetermined location 30 to attempt to read EDI information 38 through illumination of optical medium 14 by a laser 18. EDI information 38 is associated with optical media adapted for use with blue laser 46, however, is formatted to be read by either blue laser 46 or red laser 48. Identification module 20 commands red laser 48 to attempt to read EDI information 38 so that a single spindle kick of optical medium 14 determines whether optical medium 14 is a blue or red laser medium. If red laser 48 detects EDI information, then identification module 20 applies the EDI information to initiate use of optical medium 14 with blue laser 46. If red laser 48 fails to detect EDI information, then identification module 20 proceeds with a DVD detection algorithm to determine whether optical medium 14 is adapted for use by a red laser. If the DVD detection algorithm fails to detect that optical medium 14 is adapted for use with the red laser, identification module 20 initiates IR laser 50 to perform a CD detection algorithm with both blue and red laser adapted media eliminated from the identification process through the initial spindle kick. In one alternative embodiment, the EDI information is embedded in a CD format to be read by IR laser 50 instead of red laser 48.

Figure 2:
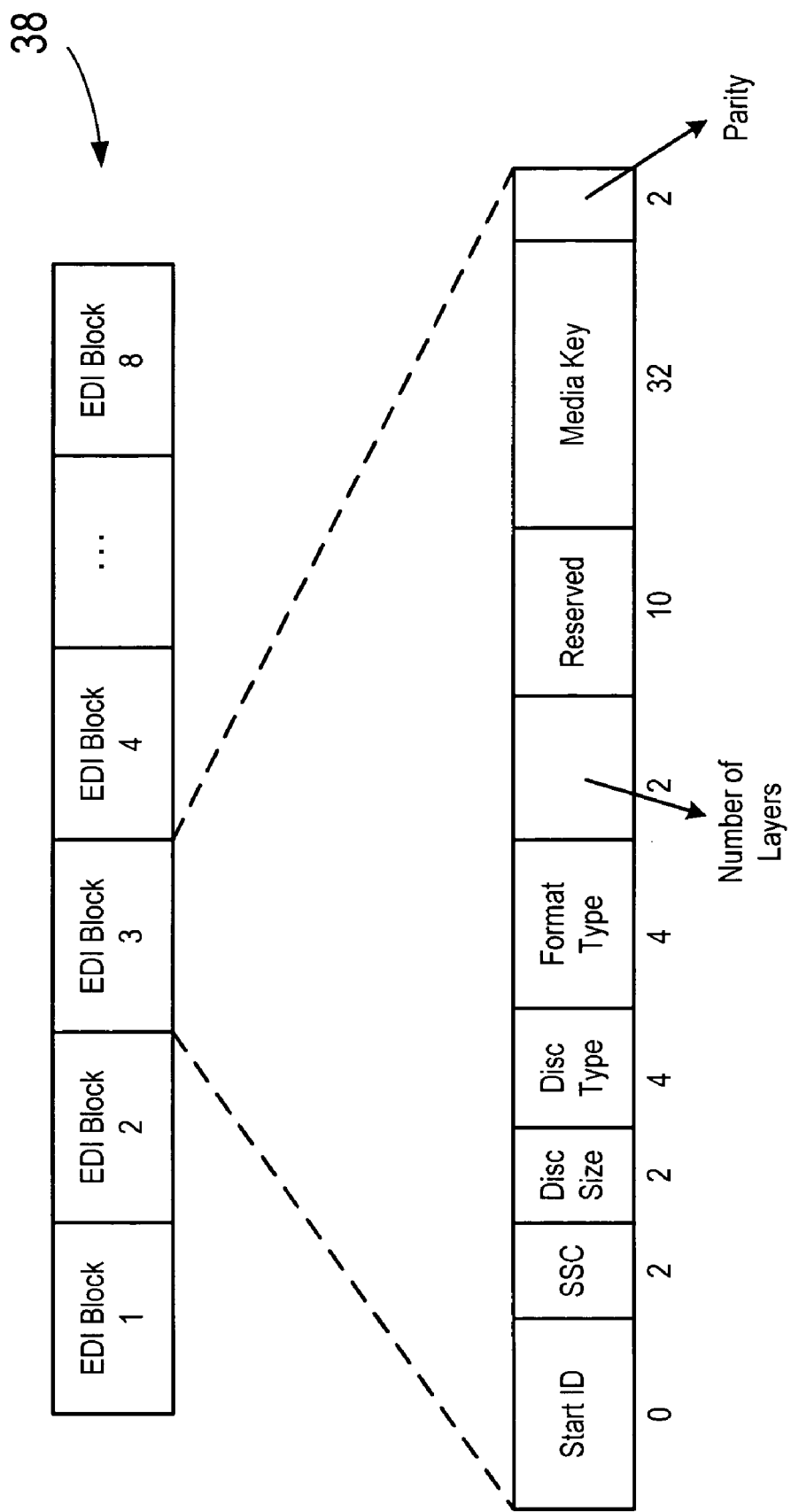
FIG. 2 depicts a block diagram of an example of embedded EDI information associated with a blue laser optical medium.

Referring now to FIG. 2, a block diagram depicts an example of EDI information 38 with eight repeated portions. The start_ID provides a unique identifier for blue laser media that allows optical drive manufacturers to prepare read and write parameters for different types of media. The remaining sub-blocks provide additional information for use by an optical drive, such as whether an SSC code is available, the size of the optical medium, type of medium as read only, writable or re-writable, the format, the number of data layers, and other information. In order to allow EDI information to be read by both red and blue lasers while avoiding multiple feature depth discs, the features of the embedded data have the same depth as the deepest feature in the data area and are sufficient to allow detection with both types of lasers. Similarly, the repetition frequency of the features is compatible with both red and blue laser detection for applicable Numerical Apertures under reasonable focal offset. For example, EDI information is embedded with a frequency modulated band of approximately 0.5 mm width and with bit cells of approximately 0.3 mm length. The high level in the modulation code is represented by a non-modulated area and the low level by an area with spatial frequency of approximately 1.7 micrometers.

Figure 3:
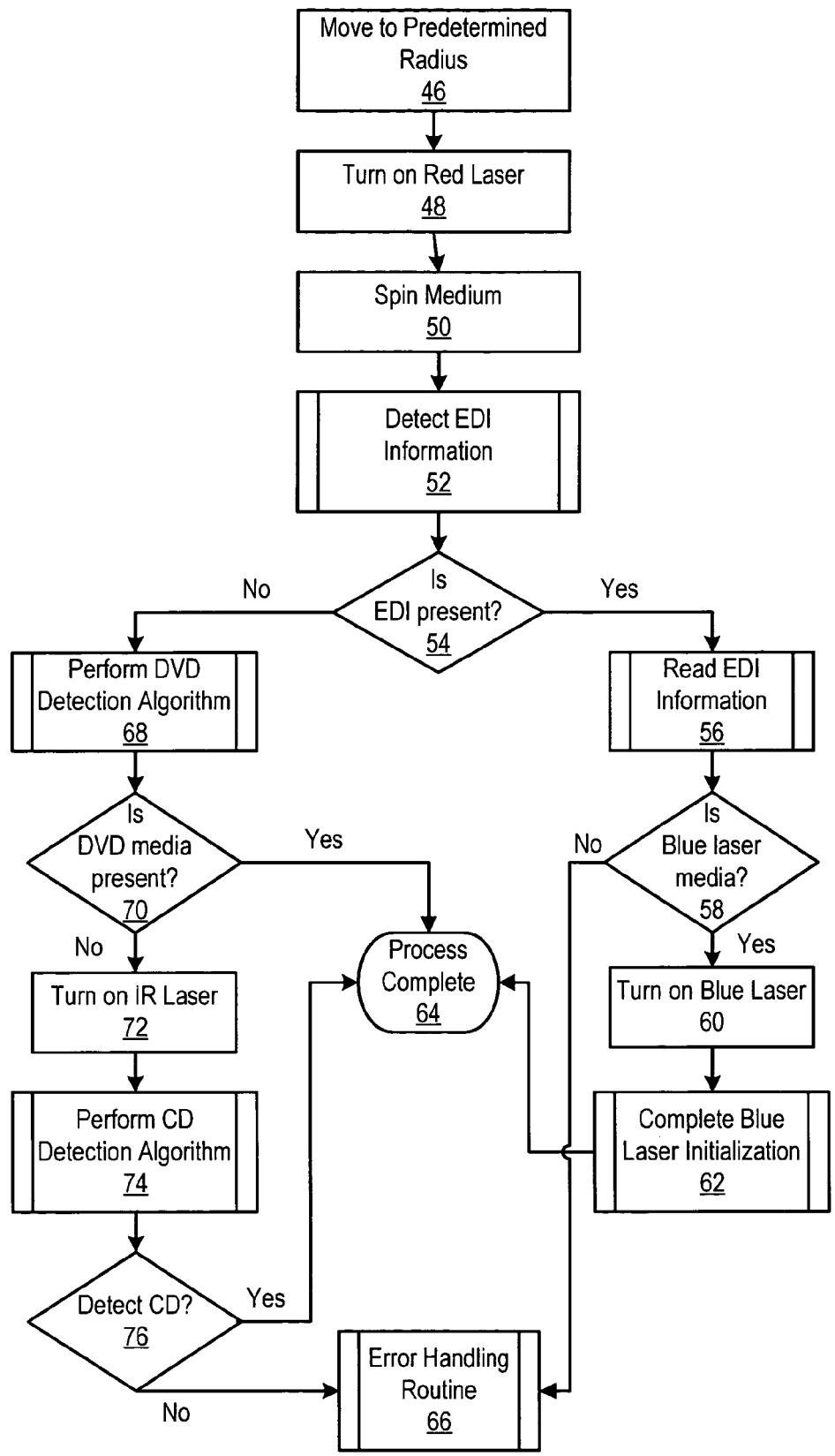
FIG. 3 depicts a flow diagram of a process for recognition of plural types of optical media.

Referring now to FIG. 3, a flow diagram depicts a process for recognition of an optical medium. The process begins at step 46 after insertion of the optical medium into an optical drive with movement of the pick-up read head to a predetermined radius. At step 48 the red laser is turned on to illuminate the optical medium and, at step 50, the optical medium is spun to allow a read attempt with reflected red laser illumination. At step 52, the reflected red laser light is analyzed to detect whether EDI information is stored on the optical medium. In an alternative embodiment, an attempt may instead be made to read SSC information instead of EDI information, although the use SSC information is more prone to errors in the event the SSC information is damaged at the surface of the optical medium.

If the determination at step 54 is that EDI information is stored, the process continues to step 56 at which the EDI information is read with illumination by the red laser. At step 58, a determination is made from the read EDI information of whether the optical medium is a blue laser media. If yes, the process continues to step 60 for the blue laser to turn on and then step 62 at which the initialization of blue laser operations is performed with the read EDI information. The process completes at step 64 with the optical drive operational to use the blue laser optical medium. If at step 58, the read EDI information fails to confirm that the optical medium is an appropriate blue laser media, the process ends at step 66 with an error.

Returning to step 54, if no EDI information is detected, the process continues to step 68 for performance of a DVD detection algorithm to determine if the optical medium is a red laser optical medium. If at step 70 the DVD detection algorithm detects that the optical medium is DVD compatible, the process completes at step 64 with a single spindle kick applied to determine if the optical medium is one of two types, i.e., blue or red laser. If the DVD detection algorithm fails to detect a DVD optical medium, the process continues to step 72 at which the IR laser is turned on and step 74 for performance of a CD detection algorithm. If a CD is detected at step 76, the process completes at step 64. If a CD is not detected, an error is indicated at step 66 since all media types have been tested. In the alternative embodiment in which EDI information is readable by an IR laser instead of a red laser, the process remains substantially the same except that the initial check for EDI information and the initial detection algorithm at steps 52 and 68 are performed with an IR laser and the final detection algorithm is performed with a red laser.

Although the present invention has been described in detail, it should be understood that various changes, substitutions and alterations can be made hereto without departing from the spirit and scope of the invention as defined by the appended claims.

What is claimed is:

1. An information handling system comprising:
    plural components operable to process information;
    an optical drive interfaced with the plural components and operable to communicate information between the plural components and an optical medium, the optical drive having plural lasers, each laser associated with a type of optical medium; and
    an optical medium identification module associated with the optical drive and operable to illuminate an optical medium with a first of the plural lasers to detect identification information embedded on the optical medium that identifies the optical medium as associated with a second of the plural lasers.

2. The information handling system of claim 1 wherein the first laser comprises a red laser and the second laser comprises a blue laser.

3. The information handling system of claim 2 wherein the optical medium identification module is further operable to initiate use of the blue laser for the optical medium if the red laser detects the identification information associated with the blue laser.

4. The information handling system of claim 2 wherein the optical medium identification module is further operable to perform a DVD detection algorithm if the red laser fails to detect the identification information associated with the blue laser.

5. The information handling system of claim 4 wherein the plural lasers further comprise an infrared (IR) laser and the optical medium identification module is further operable to perform a CD detection algorithm with the IR laser if the DVD detection algorithm fails to identify the optical medium as a DVD.

6. The information handling system of claim 1 wherein the first laser comprises an IR laser and the second laser comprises a blue laser.

7. The information handling system of claim 6 wherein the optical medium identification module is further operable to initiate use of the blue laser for the optical medium if the IR laser detects the identification information associated with the blue laser.

8. The information handling system of claim 7 wherein the optical medium identification module is further operable to perform a CD detection algorithm if the IR laser fails to detect the identification information associated with the blue laser.

9. The information handling system of claim 8 wherein the plural lasers further comprise a red laser and the optical medium identification module is further operable to perform a DVD detection algorithm with the red laser if the CD detection algorithm fails to identify the optical medium as a CD.

10. A method for identifying an optical medium inserted into an optical drive having plural lasers, the method comprising:
    selecting a first of the plural lasers to illuminate the optical medium;
    attempting with the first laser to read identification information from the optical medium that is associated with a second of the plural lasers;
    initiating use of the second laser according to the identification information if the attempt to read the identification information with the first laser succeeds; and
    performing a detection algorithm with the first laser if the attempt to read the identification information fails, the first laser detection algorithm attempting to identify the optical medium as associated with the first laser.

11. The method of claim 10 further comprising:
    initiating use of the first laser if the first laser detection algorithm succeeds;
    performing a detection algorithm with a third laser if the first laser detection algorithm fails, the third laser detection algorithm attempting to identify the optical medium as associated with the third laser.

12. The method of claim 11 wherein the first laser comprises a red laser, the second laser comprises a blue laser and the third laser comprises an IR laser.

13. The method of claim 11 wherein the first laser comprises an IR laser, the second laser comprises a blue laser and the third laser comprises a red laser.

14. The method of claim 11 wherein the optical medium associated with the first laser comprises a DVD and the optical medium associated with the third laser comprises a CD.

15. The method of claim 11 wherein the optical medium associated with the first laser comprises a CD and the optical medium associated with the third laser comprises a DVD.

16. An optical medium comprising:
    a data layer operable to store data readable by a first laser;
    a protective surface disposed over the optical medium;

embedded identification information disposed for reading by a second laser, the identification information identifying the optical medium as associated with the first laser.

17. The optical medium of claim 16 wherein the identification information is embedded on the protective surface.

18. The optical medium of claim 16 wherein the first laser comprises a blue laser and the second laser comprises an IR laser.

19. The optical medium of claim 16 wherein the first laser comprises a blue laser and the second laser comprises a red laser.

20. The optical medium of claim 19 wherein the identification information is embedded in the data layer as a frequency modulated band having a width of approximately 0.5 mm and having bit cells of a length of approximately 0.3 mm long.

* * * * *